US009100349B2

(12) United States Patent
Balakavi et al.

(10) Patent No.: US 9,100,349 B2
(45) Date of Patent: *Aug. 4, 2015

(54) USER SELECTABLE MULTIPLE PROTOCOL NETWORK INTERFACE DEVICE

(71) Applicant: BROCADE COMMUNICATIONS SYSTEMS, INC., San Jose, CA (US)

(72) Inventors: Venkata Pramod Balakavi, San Jose, CA (US); Venky Nagapudi, Milpitas, CA (US); Sathseel Altekar, San Jose, CA (US); Surya Prakash Varanasi, Dublin, DC (US); Li Zhao, San Jose, CA (US); Yash V. Bansal, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,900

(22) Filed: Nov. 16, 2012

(65) Prior Publication Data
US 2013/0315256 A1    Nov. 28, 2013

Related U.S. Application Data

(63) Continuation of application No. 12/570,565, filed on Sep. 30, 2009, now Pat. No. 8,340,120.

(60) Provisional application No. 61/240,184, filed on Sep. 4, 2009.

(51) Int. Cl.
*H04L 12/931* (2013.01)
*H04L 12/66* (2006.01)
(Continued)

(52) U.S. Cl.
CPC .............. *H04L 49/602* (2013.01); *H04L 12/66* (2013.01); *G06F 1/32* (2013.01); *G06F 3/067* (2013.01); *G06F 3/0625* (2013.01); *G06F 3/0634* (2013.01); *Y02B 60/1246* (2013.01)

(58) Field of Classification Search
CPC .............................. H04L 12/66; H04L 49/602
See application file for complete search history.

(56) References Cited

U.S. PATENT DOCUMENTS 5,519,704 A * 5/1996 Farinacci et al. ............. 370/402
6,680,952 B1 * 1/2004 Berg et al. ...................... 370/467
7,598,768 B1   10/2009 Tetzlaff et al.
(Continued)

OTHER PUBLICATIONS

Dave Convery, "Storage Protocol Differences and FCoE Diagrams," Tech-Tap, http://www.tech-tap.com/2009/06/17/storage-protocol-differences-and-fcoe-diagrams/, Jun. 17, 2009.

(Continued)

*Primary Examiner* — Jason Mattis
(74) *Attorney, Agent, or Firm* — Blank Rome LLP

(57) ABSTRACT

An Ethernet/Fiber Channel network interface device which can be configured by a user to operate on an FC SAN, a CEE network or both. In one embodiment the configuration can be done using jumpers or connections to the pins of a chip, thus allowing a manufacturer to only inventory one device for use with either or both networks. In a second embodiment the configuration can be done in software by setting registers and memory values on the device. This embodiment allows the device to be changed between configurations without removing it from the server or blade. The devices according to the preferred embodiments further reduce power consumption by shutting down portions of the chip not needed based on the configuration of the device.

12 Claims, 7 Drawing Sheets

(51) Int. Cl.
    *G06F 3/06*     (2006.01)
    *G06F 1/32*     (2006.01)

(56) References Cited

U.S. PATENT DOCUMENTS

| | | |
|---|---|---|
| 7,908,404 B1 | 3/2011 | Lok et al. |
| 8,340,120 B2 * | 12/2012 | Balakavi et al. ............. 370/463 |
| 2003/0067884 A1 * | 4/2003 | Abler et al. ................. 370/252 |
| 2005/0050230 A1 | 3/2005 | Vo |
| 2005/0114083 A1 | 5/2005 | Bullis |
| 2009/0106470 A1 | 4/2009 | Sharma et al. |
| 2009/0177819 A1 | 7/2009 | Kang |
| 2009/0279540 A1 | 11/2009 | Van Wageningen |
| 2010/0250974 A1 | 9/2010 | Ristic et al. |

OTHER PUBLICATIONS

Ixia, "Black Book—Converged Network Adapters (CNA)," Emulex Corp., http://www.emulex.com/artifacts/63eed816-a0c5-4ebe-93d9441a88bb9ac2/ixia.pdf, Oct. 2009.

T11, "Fiber Channel Backbone-5 (FC-BB-5)," INCITS, Jun. 4, 2009, pp. begin to 28 and 81-165.

* cited by examiner

Figure 2A
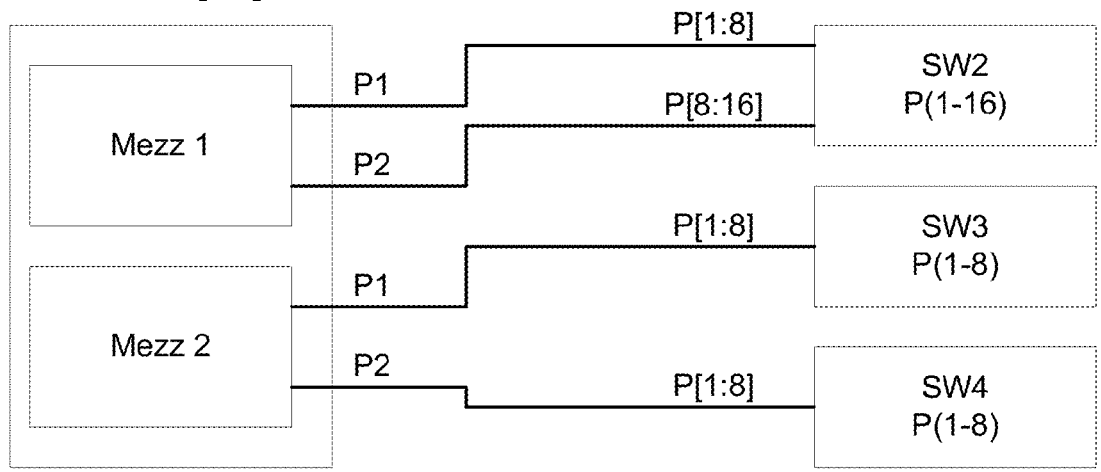
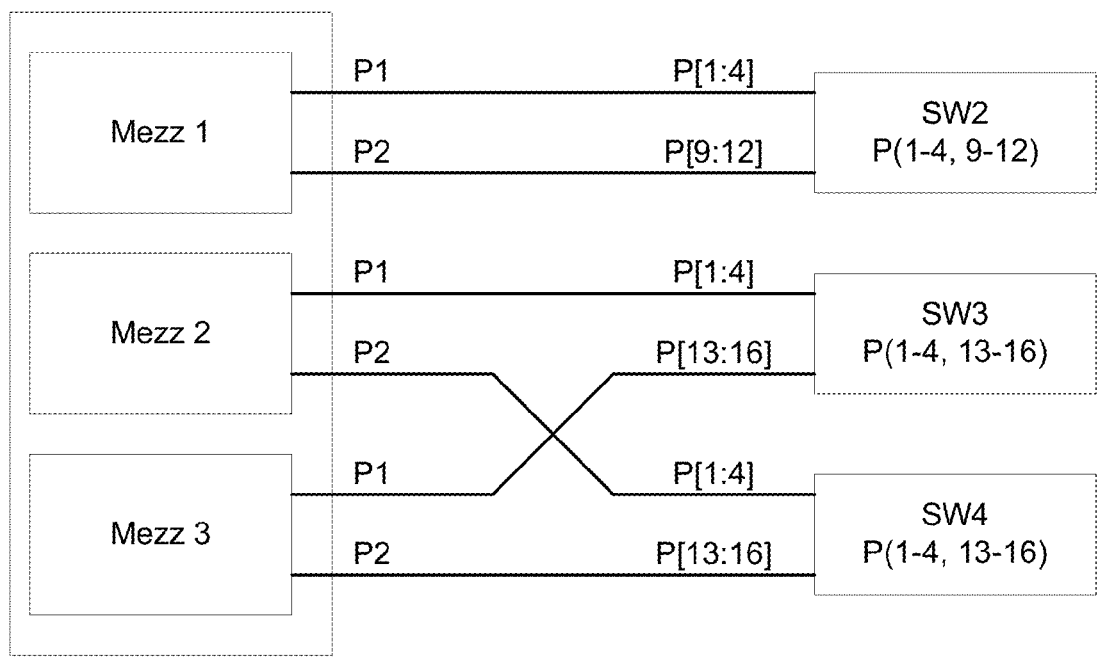
Figure 2B

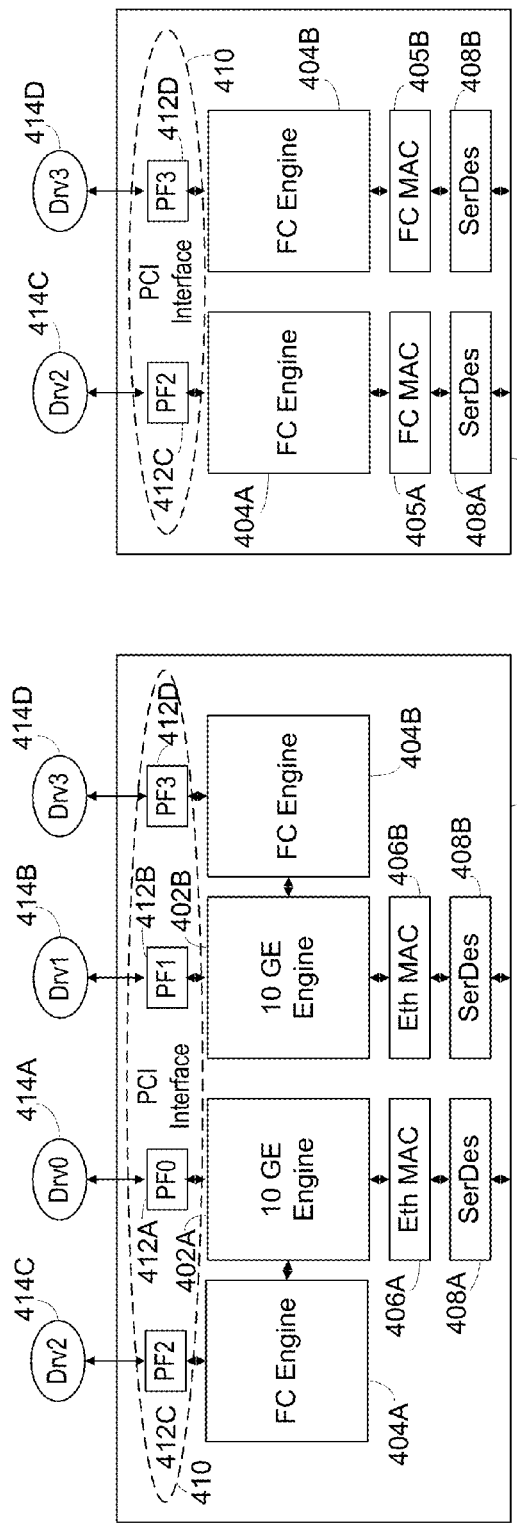
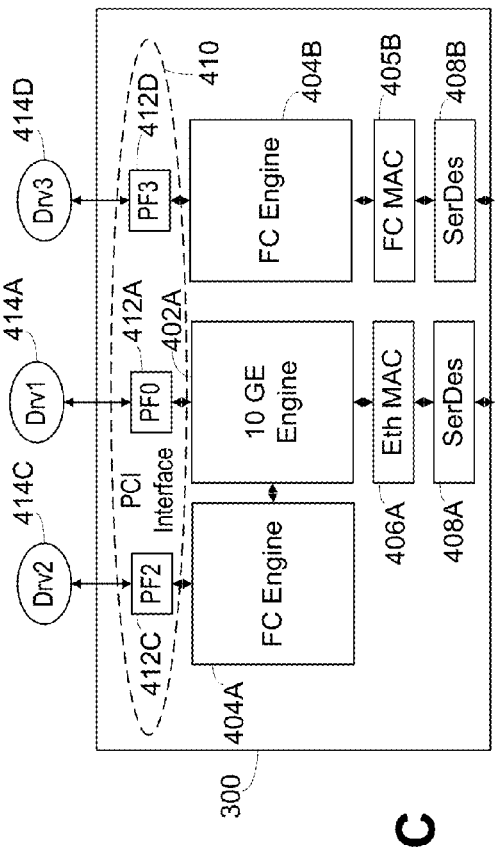
Figure 4A
Figure 4B
Figure 4C

USER SELECTABLE MULTIPLE PROTOCOL NETWORK INTERFACE DEVICE

CROSS REFERENCE TO RELATED APPLICATIONS

This application claims priority under 35 U.S.C. §120 to U.S. patent application Ser. No. 12/570,565 entitled "User Selectable Multiple Protocol Network Interface Device" filed Sep. 30, 2009, which claims the benefit under 35 U.S.C. §119(e) of U.S. Provisional Patent Application Ser. No. 61/240,184 entitled "User Selectable Multiple Protocol Network Interface Device," filed Sep. 4, 2009, both of which are hereby incorporated by reference.

BACKGROUND OF THE INVENTION

1. Field of the Invention

Embodiments according to the invention relates to network interface cards. More particularly, embodiments according to the invention relate to providing a single network interface card that is user selectable to work with two different networking protocols.

2. Description of the Related Art

Effectively deploying multiple devices in a network environment becomes an increasingly complex task as transmission data rates, processor speeds, and storage capacities increase. Storage area networks (SANs) have been developed as specialized high-speed networks, referred to as fabrics, to connect computer systems, control software, and storage devices over the fabric. SANs typically allow block level input/output (I/O) rather than file-level access. Thus, every device connected to a SAN fabric appears as a locally attached device to other devices on the fabric.

Local area networks (LANs) are used to connect devices, but primarily for file level transfers. LANs are used to connect servers together in data centers as well as connecting individual workstations to servers. Therefore it is very common for large data centers to have two networks, a LAN for communication with workstations and a SAN for storage.

FIG. 1 shows components in a prior art blade chassis 101. The blade chassis 101 includes a Fibre Channel switch 102, an Ethernet switch 103 and a series of host blades 104. Each host blade 104 has a processor 106, a bridge 108, memory 109, an Ethernet network interface 107 and a host bus adapter (HBA) 110. Conventionally, the HBA no is a daughter or mezzanine board connected to the host blade 104. Also conventionally one Ethernet interface 107 is present on the host blade 104 itself but an additional Ethernet interface 107 can be present as a daughter or mezzanine board as well. Each memory 109, connected to the bridge 108, contains queues that comprise command and completion rings for data sent to and received from the Ethernet interface 107 and the HBA 110. The bridge 108 handles I/O processes and provides an interface between devices internal to and external to the host blade 104 (e.g., central processing unit (CPU) 106, HBA no). As an example, the bridge 108 can provide PCI-Express (PCI-E) connections to the HBA no and the Ethernet interface 107. Each HBA no connects the respective host blade 104 to other network and storage devices 114 on an enterprise fabric 112 via the Fibre Channel switch 102. As is known in the art, each HBA no has a unique World Wide Name (WWN), which identifies the HBA no, and thus the respective host blade 104, to the Fibre Channel switch 102 and other devices on the enterprise fabric 112. Similarly, each Ethernet interface 107 has a unique MAC address for a similar purpose.

One approach being developed to address the dual fabric environment of the data center is a converged Ethernet network. A converged, enhanced Ethernet (CEE) network will use converged network adapters (CNAs). A CNA is capable of operating according to 10G Ethernet but also using a new protocol being developed referred to as FCoE or Fibre Channel over Ethernet. In a simple explanation, FCoE uses the FCP packets and commands normally used in Fibre Channel but places them in Ethernet packets rather than FC packets. Currently FCoE to FC bridges are available to allow a CEE network and servers or hosts with CNAs to access existing FC SANs. Eventually it is believed that storage devices will eventually be converted to FCoE and attach directly to the CEE network. But it is also understood that FC SANs will remain in use and continue to be installed for some period of time.

This developing situation of CEE networks and FC SANs presents problems for both manufacturers and users. For a native connection to the FC SAN, an FC HBA is needed. For connection to the CEE network, a CNA is needed. Therefore both the manufacturer and the user have to inventory and install two different cards or boards, an FC HBA and a CNA. This multiple inventory situation requires more devices and SKUs and also can lead to confusion and misconfiguration. Further, if a user desires to convert from an FC HBA to a CNA, as in a blade server chassis, the user must not only replace the switch in the chassis but also must remove each blade and change the mezzanine board. In a conventional server, to convert would require opening up the server to exchange an FC HBA and a CNA in the unit. Both of these operations greatly increase the time and trouble required to convert from directly connecting to an FC SAN to connecting to a CEE network for storage applications. It would be desirable to reduce the need to inventory two different cards or boards and also to allow users to reconfigure a server or blade without having to remove components inside a server or on a blade.

SUMMARY OF THE INVENTION

An Ethernet/Fibre Channel network interface device according to one or more embodiments of the invention can be configured by a user to operate on an FC SAN, a CEE network or both. In one embodiment the configuration can be done using jumpers or connections to the pins of a chip, thus allowing a manufacturer to only inventory one device for use with either or both networks. In a second embodiment the configuration can be done in software by setting registers and memory values on the device. This embodiment allows the device to be changed between configurations without removing it from the server or blade. The devices according to the preferred embodiments further reduce power consumption by shutting down portions of the chip not needed based on the configuration of the device.

BRIEF DESCRIPTION OF THE DRAWINGS

FIGS. 2A, 2B, 2C and 2D are block diagrams of the internal connections between mezzanine boards connected to various blades in various blade chasses and switches located in the blade chasses.

FIGS. 4A, 4B and 4C are block diagrams of various configurations of the Ethernet/Fibre Channel chip of FIGS. 3A and 3B according to an embodiment of the invention.

DETAILED DESCRIPTION

Reference will now be made in detail to several embodiments of the invention, examples of which are illustrated in the accompanying drawings. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment. Wherever practicable, the same reference numbers will be used throughout the drawings to refer to the same or like parts.

Figure 1:
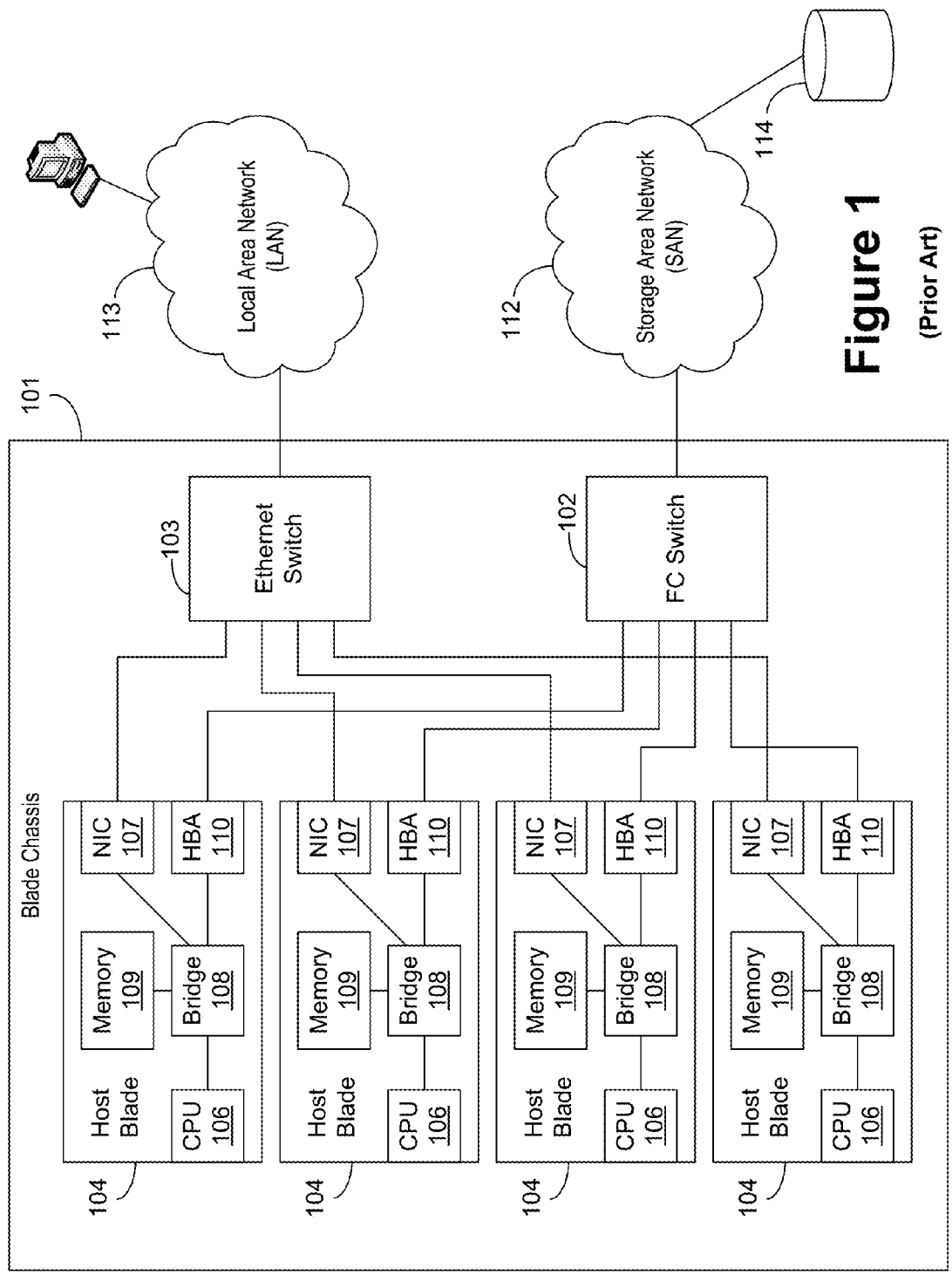
FIG. 1 is a schematic representation of a prior art blade chassis connected to two different networks using different network protocols.
Figure 2C:
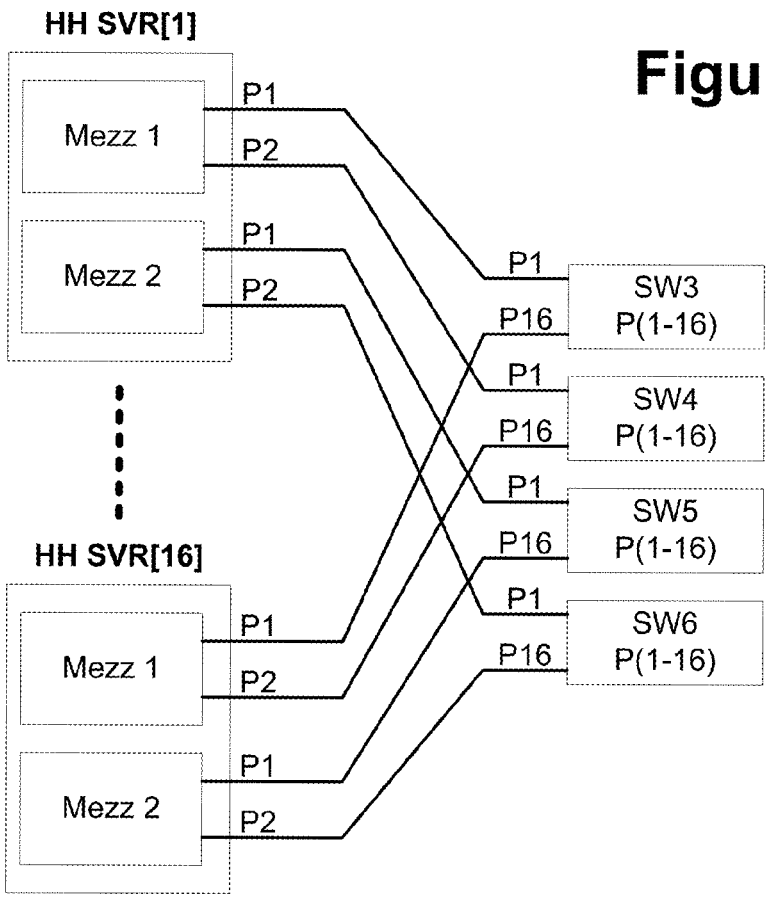
Figure 2D:
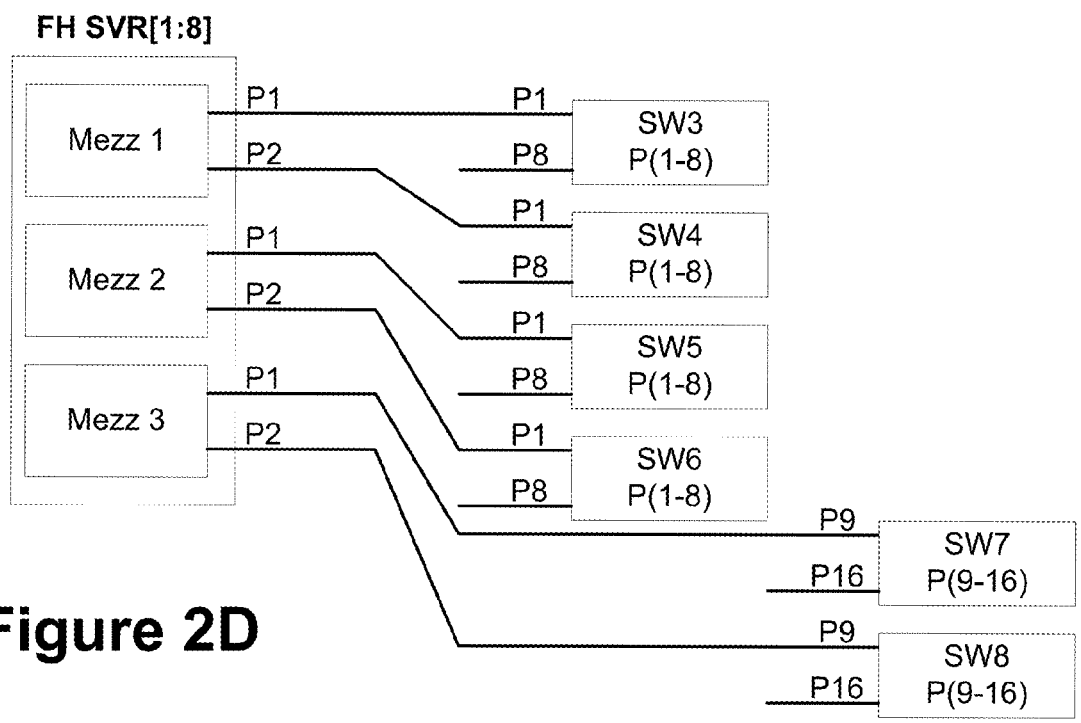

Referring now FIGS. 2A-2D, two variations of configurations for two different exemplary blade server chasses are shown. FIGS. 2A and 2B are for a smaller chassis which can receive either eight half height blades or four full height blades. FIGS. 2C and 2D are for a larger chassis which can receive either 16 half height blades or 8 full height blades. The smaller chassis can hold four switch modules, switch module 1 being dedicated for an Ethernet connection provided on the blade itself. Switch modules 2, 3 and 4 are user selectable to be various types of switches, such as Ethernet, Fibre Channel or InfiniBand. In FIGS. 2A and 2B the design is constrained as all ports on a mezzanine 1 board connect only to switch 2. However, in FIGS. 2A and 2B, the first ports of the mezzanine 2 boards connect to switch 3 and the second ports connect to switch 4. Using conventional designs, both switch 3 and switch 4 would be required to be of the same network protocol, such as Ethernet or Fibre Channel. The mezzanine 3 board of FIG. 2B is similarly connected to the mezzanine 2 board.

The situation is slightly different in FIGS. 2C and 2D. In those designs switches 1 and 2 are both dedicated to on-blade Ethernet connections. In both FIGS. 2C and 2D, port 1 of the mezzanine 1 board is connected to switch 3 and port 2 is connected to switch 4, while port 1 of the mezzanine 2 board is connected to switch 5 and port 2 is connected to switch 6. This is highly constraining as switches 3 and 4 and switches 5 and 6 would both have to be of the same network protocol because a single mezzanine board connects to each switch. Similarly, in FIG. 2D, switches 7 and 8 would have to be the same network protocol as they are connected to the same mezzanine 3 board.

Figure 3A:
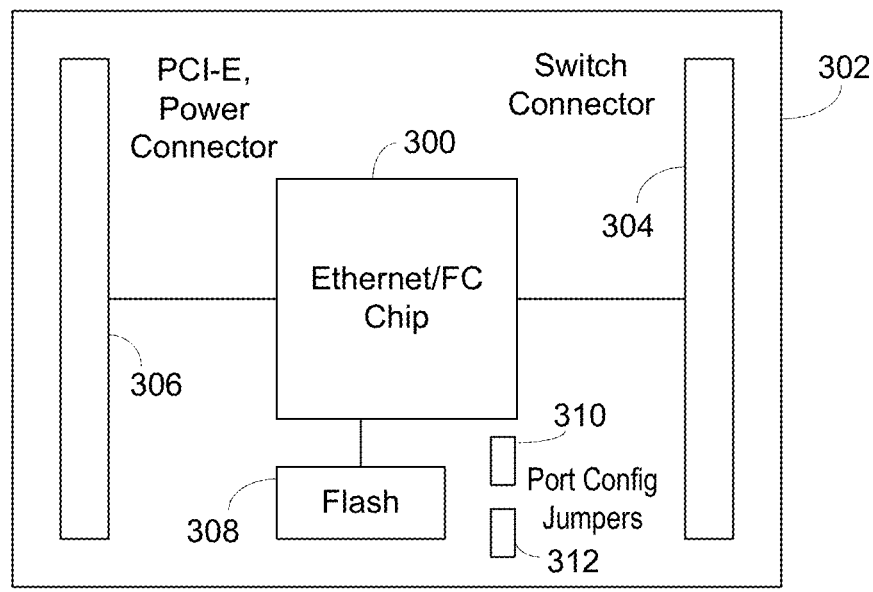
FIG. 3A is a block diagram of a mezzanine board for use in the blade chasses of FIGS. 2A-2D according to an embodiment of the invention.

FIG. 3A illustrates a mezzanine board 302 according to the preferred embodiment. The primary component on the mezzanine board 302 is an Ethernet/FC chip 300. The Ethernet/FC chip 300 is connected to a switch connector 304, which connects to a connector on a blade which then connects to the switches as shown in FIGS. 2A-2D. The Ethernet/FC chip 300 is also connected to PCI-E and power connector block 306. In the preferred embodiment the Ethernet/FC chip 300 has a PCI-Express or PCI-E interface for communication with the main processor on the blade. The connector block 306 provides that connection and provides power, ground and clock signals from the blade to the mezzanine board 302. A Flash memory 308 is connected to the Ethernet/FC chip 300 to provide configuration information and firmware to embedded processors on the Ethernet/FC chip 300. Operation of the flash memory 308 will be discussed in more detail below. Port configuration jumpers 310 and 312 are shown on the mezzanine board 302 as well. In the preferred embodiments the Ethernet/FC chip 300 can have the operational network protocol of each port individually configured. In one embodiment this configuration can be done by applying voltages to selected pins of the Ethernet/FC chip 300. The jumpers 310 and 312 provide that capability in that instance. In a second embodiment discussed in more detail below, the port configurations can be set by programming registers or configuration information in the Flash memory 308.

Figure 3B:
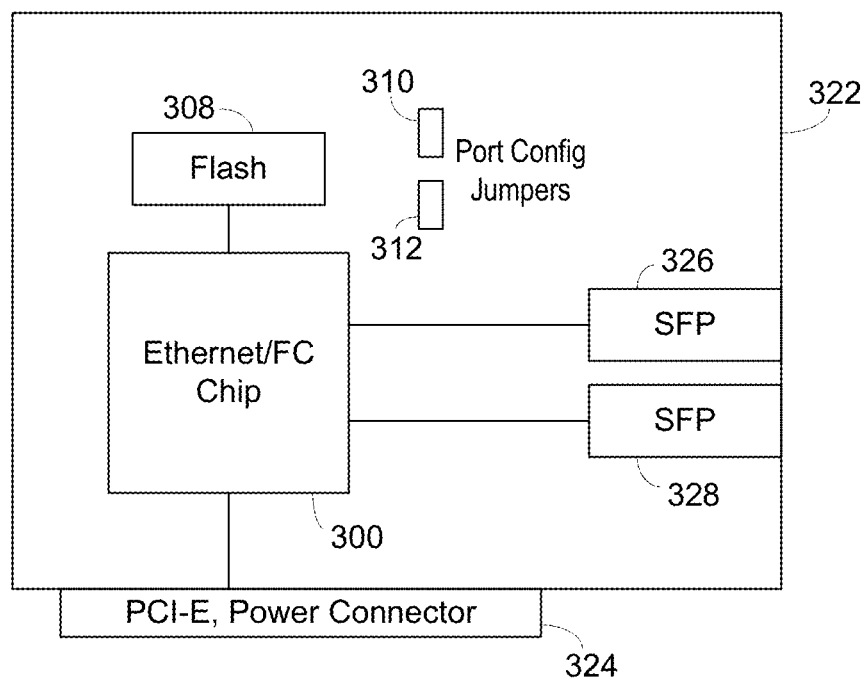
FIG. 3B is a block diagram of an adapter board for use in servers according to an embodiment of the invention.

FIG. 3B is similar to FIG. 3A, except that instead of a mezzanine board 302, a PCI-E adapter card block 322 is illustrated. The adapter card block 322 is for use in servers rather than on blades. The Ethernet/FC chip 300 is connected to a PCI-E and power connector block 324 for communication of the PCI-E signals and power and clock signals. The Ethernet/FC chip 300 is also connected to SFP modules block 326 and 328. SFP modules receive optoelectronic converters for use with fiber optic cabling, as commonly used in Fibre Channel and 10G Ethernet. The SFP modules are not present on the mezzanine board 302 as connections to the switches are made according to backplane standards as used on the blades and chassis interconnect boards.

The Ethernet/FC chip 300 has three "personalities" in which it can be used in the preferred embodiment. The Ethernet/FC chip 300 can be switched from one mode to another through Flash reprogramming and software switches or by jumper reconfiguration, depending on the specific embodiment.

FC-HBA mode: In this mode, the Ethernet/FC chip 300 is a dual port FC HBA. Both ports will be capable of FC speeds only. The FC ports can be autonegotiated to 8G, 4G, 2G or 1G speeds. In the FC-HBA mode, the Ethernet/FC chip 300 will communicate with a FC switch using three media:

Fiber Optics: In this mode, an SFP+ transceiver is used to communicate through an optical fiber.

Copper cable: In this mode, a Direct Attach Copper Cable is used to communicate with an embedded switch in a blade-server chassis.

Backplane: In this mode, the Ethernet/FC chip 300 communicates with an embedded switch through an electrical backplane.

FCoE/NIC mode: In this mode, the Ethernet/FC chip 300 is a dual port 10G NIC with FCoE capabilities. Both ports will be capable of either 10G or 1G Ethernet. 10G speeds can be achieved through XAUI (4 lanes) or XFI (one lane). 1G speed is achieved using SGMII. In this mode, the Ethernet/FC chip 300 provides Ethernet acceleration and FCoE acceleration with both networking ports configured as Ethernet ports. As in the case of FC, there are several media over which the Ethernet/FC chip 300 can communicate with a switch (embedded or network).

Optics: In this mode, the SERDES for each port is used in the XFI mode at 10.3125 Gbps to talk to a SFP+ transceiver.

Copper: In this mode, Direct Attach Copper is used to communicate with an embedded switch at 10 Gbps or 1 Gbps speeds.

Backplane: In this mode, the Ethernet/FC chip 300 communicates with an embedded switch in either XAUI, XFI or SGMII speeds. Backplane autonegotiation (802.3ap) is supported for switching between these three speeds.

Mixed HBA/NIC mode: In this mode, one port of the Ethernet/FC chip 300 is in FC HBA mode, while the other port is in Ethernet mode. With this mode, the Ethernet/FC chip 300 can provide connectivity between the server and an FC SAN, while providing connectivity to an Ethernet LAN simultaneously. In this mode, one port of the Ethernet/FC chip 300 will be in Ethernet mode (XAUI/XFI/SGMII), while the other port is in FC mode (8G/4G/2G/1G).

FIGS. 4A-4C illustrates various configurations of the Ethernet/FC chip 300. Each of the figures illustrates the Ethernet/FC chip 300 and shows the interaction with the driver software present on the server or blade. FIG. 4A is the dual FCoE/NIC mode illustration. The Ethernet/FC chip 300 is configured internally to have two 10G Ethernet engines 402A and 402B, each connected to an FC engine 404A and 404B. The FC engine provides the FCoE support, as will be explained in more detail below. Each Ethernet engine 402A, 402B is connected to an Ethernet MAC 406A, 406B, which is connected to a serializer/deserializer or serdes 408A, 408B. As known to one skilled in the art, according to the PCI-E specifications, each device presents various functions to the computer system via the PCI-E interface. In the illustrated case for simplicity only single physical functions (PFs) are shown as being presented via the virtual PCI-E interface 410. In the illustrated case the PFs 412A and 412B are provided, one for each Ethernet engine 402A, 402B, and PFs 412C and 412D are provided, one for each FC engine 404A, 404B. It is understood that in many instances multiple physical functions may be presented as the devices are commonly very complicated and able to present themselves as multiple physical devices. In addition, it is understood that virtual devices or functions can also be presented via the PCI-E interface. None are shown for simplicity of this explanation. The operating system (not shown) of the server or blade loads Ethernet drivers 414A and 414B to interact with PFs 412A and 412B and FC drivers 414C and 414D to interact with PFs 412C and 412D. Conventionally these drivers are loaded during initialization or booting of the server or blade. If FCoE functionality is not needed, the FC engines 404A, 404B; the PFs 412C, 412D and the drivers 414C, 414D would not be utilized.

FIG. 4B illustrates the dual FC HBA mode. The FC engines 404A and 404B are present and connected to FC MACs 405A and 405B, which are connected to the serdes 408A and 408B. In this case the physical functions are PFs 412C and 412D, which correspond to FC functions, as distinguished from RFs 412A and 412B, which correspond to Ethernet functions. The FC drivers 414C and 414D would load to interact with the PFs 412C, 412D.

FIG. 4C illustrates the mixed HBA/NIC mode. A 10G Ethernet engine 402A is present, with its associated FC engine 404A for FCoE frames. An FC engine 404B is present for the HBA functionality. The relevant MACs, PFs and drivers are present, provided or loaded to correspond to the Ethernet, FCoE and FC functions being provided.

The mixed HBA/NIC mode of FIG. 4C provides additional flexibility with the blade chasses of FIGS. 2A-2D. In all cases switches 3 and 4 can be different protocols, say 10G Ethernet and 8G FC. In the cases of FIGS. 2C and 2D, switches 5 and 6 and 7 and 8 can also be different protocols, 10G Ethernet and FC. Therefore the mixed mode improves flexibility in the various blade chasses configurations.

Figure 5:
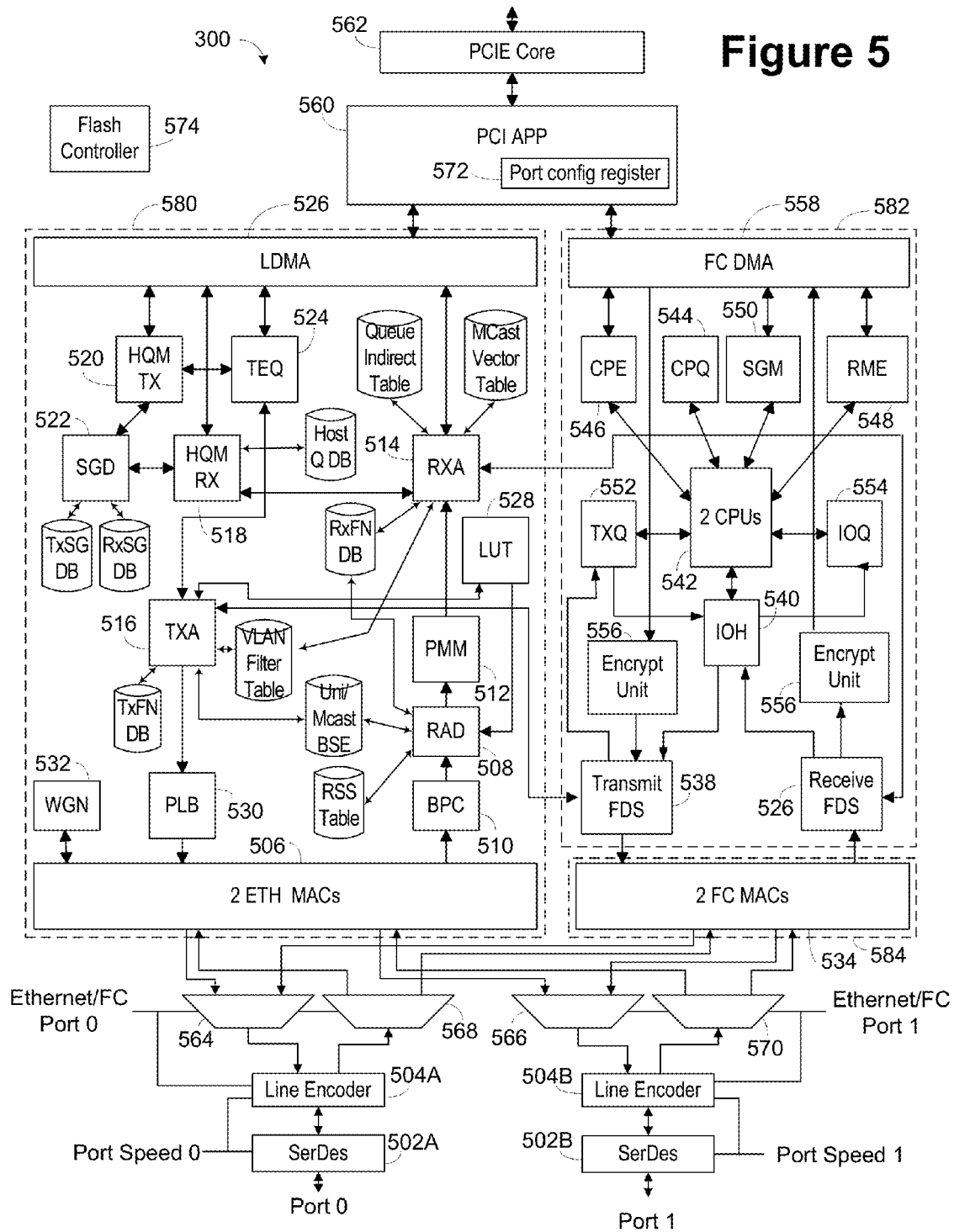
FIG. 5 is a block diagram of the Ethernet/Fibre Channel chip of FIGS. 3A and 3B according to an embodiment of the invention.

FIG. 5 is a detailed block diagram of the Ethernet/FC chip 300. The Ethernet/FC chip 300 is formed by various modules and databases. They are briefly listed below in table form, with more detailed descriptions following the table.

TABLE 1

Description of the Ethernet/FC chip 300 modules

| | |
|---|---|
| Serdes 502 | Serializer/deserializer that can be configured as 8/4/2/1 G FC or 10/1 G Ethernet. |
| Line Encoder 504 | Performs 8b/10b or 60b/66b encoding and decoder, depending on protocol and speed. 8/4/2/1 G FC uses 8b/10b while 10 G Ethernet uses 60b/66b. |
| Eth MAC 506 | Contains the 10 G MAC for 10 G and the 1 G/100M MAC. |
| RAD 508 | On-the-fly packet parser classifier and integrity checker. |
| BPC 510 | Back Pressure Controller. Responsible for Per-Priority-Pause processing and management. |
| PMM 512 | Packet Manager aggregates and manages inbound packet events and outbound packet descriptors. |
| RXA 514 | Receive Agent evacuates packets from PMM to Host memory and apply further inbound processing to packets. |
| TXA 516 | Transmit Agent accepts Packet Send commands from the HQM through the PMM and sends them through one of 8 PPP queues to the MAC. TXA also arbitrates and pulls FCoE frames from TxFDS to the outbound PPP queues and to the network. |
| HQM RX 518 | Scheduler and the Host Queue Manager for inbound events. It manages RxQs (Receive Queues) and CQs (Completion Queues) |
| HQM Tx 520 | Scheduler and the Host Queue Manager for outbound. Responsible for sequencing outbound events from the Host Send Queues based on relative priority and bandwidth allocation parameters. |
| SGD 522 | Manages scatter-gather vectors for outbound flows |
| TEQ 524 | Tx Event Queue. This contains the Tx event descriptors that are queues from HQM Tx to the TXA. It also contains the short frames that are part of "vector-less send" operations |
| LDMA 526 | Multi-channel DMA engine used with Ethernet side. |
| LUT 528 | Look-up table that contains the Binary Search Engines for Unicast and Multicast CAMs, Function Database and stats blocks for Ethernet frames. |
| PLB 530 | Per-priority Link Buffers. These transmit frames are stored in these buffers before they are sent to the Eth MAC. |
| WGN 532 | This is the Wake-On-LAN/Gigabit MAC/NC-SI block. This contains the Wake-up logic and the NC-SI management interface. All logic that is powered up in Aux power (other than the network MAC) is in this block. |
| FC MAC 534 | This block contains the FC MAC for traditional 8G FC. It also contains the XFM which is the 10 G/14G FC MAC. |
| Rx FDS 536 | This holds the inbound FC/FCoE frames received from RxA or from the FC MAC that are headed towards the IOH/CPU. |
| Tx FDS 538 | This holds the outbound FCoE frames that need to be transmitted to the Ethernet MAC through TXA, or FC frames that need to be transmitted to the FC MAC. |
| IOH 540 | This block contains all the hardware acceleration for some classes of FC frames, and a few other frame types. It maintains the IO State Table that holds the context for the FC/FCoE IOs. It interfaces with a number of other blocks (IOQ, FDS, CPU, TxQ) to perform the acceleration. |
| CPU0/1 542 | These are two on-chip CPUs that are used for a number of purposes including initialization of the Ethernet/FC chip 300, setting up and tearing down of FC/FCoE IOs, handling of exceptions, processing management frames and so on. |
| CPQ 544 | This holds all the event queues that need CPU processing. CPQ interfaces with a number of blocks on the FC side to route events to the CPUs. |
| CPE 546 | This is the Command Prefetch block that interfaces with the host and DMAs commands to the CPUs for further processing |
| RME 548 | This is the Reply Message block that is used by the CPU to send IO completion information to the host |
| SGM 550 | This block holds the scatter-gather elements for all the IOs processed by the CPU and IOH. It performs DMAs to the host to prefetch/fetch the scatter gather vectors |
| TxQ 552 | This structure holds all the queues and frame related information for Tx frames which are headed towards the TXA or the FC MAC |
| IOQ 554 | This block contains all the IO related queues that are directed towards the host, for FC/FCoE frames. |
| Encrypt Unit 556 | This block contains encryption/decryption logic to perform encryption and decryption operations if needed. |
| FC DMA | This block contains all the upstream and downstream data |

TABLE 1-continued

Description of the Ethernet/FC chip 300 modules

| | |
|---|---|
| 558 | DMA engines that transfer frames from the FDS to the host or vice-versa |
| PCI APP 560 | This collects DMA requests from LDMA and FC-DMA and sends them to the PCI-E core. It routes completions for these requests back to the LDMA or FC-DMA. It contains the SR-IOV related structures and logic that present a virtualized chip to the PCI-E. It interfaces to the PCI-E core. |
| PCI-E core 562 | This is the SR-IOV PCI-E core that has the Adaptation, Translation, Link and Physical Layer functionality for PCI-E bus transfers to/from the host |

The PCI APP 560 block provides the PCI-E interface to the Ethernet/FC chip 300 chip. It can act as PCI-E Master and initiate DMA transfers. It can also function as a PCI-E Target for host accesses. The PCI APP 560 block hides all the PCI-E complexity from rest of the chip 300. It interfaces with PCI-E core 562 on one side and chip blocks on the other side. It supports the following features:

High-Bandwidth datapath to and from host memory.
Cross-clock synchronization between System Clock and PCI-E Clock domains.
Supports outstanding Memory Read Requests on PCI-E interface.
Supports Max Read Request Size of 2 k bytes.
Supports Max Payload Size of 2 k bytes.
Accepts 2 k byte aligned Memory Write requests from DMA block.
Provides the register interface for host programming.
Provides Host-Local CPU Mailboxes.
Provides the shared interface to rest of the chip for all four functions.

The HQM Tx block 520 and HQM RX block 518 provide management and scheduling services for the host work queues and interrupts. The HQM Tx block 520 and HQM RX block 518 provide work for the outbound path and take care of providing all the information required to place the inbound path traffic in the proper host buffers. The HQM Tx block 520 and HQM RX block 518 are responsible for generating completion of the inbound and outbound work information and indications toward the host. This is achieved by working in tandem with the LDMA block 526 that provides DMA services for both the inbound and outbound traffic, with the SGD block 522 that provides the LDMA block 526 with proper scatter and gather information (host vectors and their length) for these DMA services, and with the receive and transmit agents. The HQM Tx block 520 and HQM RX block 518 have dedicated interfaces with LDMA block 526, SGD block 522 and RxA block 514. The HQM Tx block 520 and HQM RX block 518 are responsible for handling work, completions, and interrupts for a single network port.

The LDMA block 526 provides DMA services for the Ethernet path and works in tandem with the FC DMA block 558 that provides DMA services for the Fibre Channel path. These two blocks then converge into the PC APP block 560, which provides a common interface into the PCI-E core 562. The LDMA block 526 provides request channels for transmitted packets, received packets, and general host queue management requests. A private interface to the SGD block 522 provides the necessary translation of queue id based requests into actual host addresses. The following is a list of functions supported within the LDMA block 526:

2 channels for TXA requests.
2 channels for RxA requests.
2 channel for general HQM write requests.
2 channel for general HQM read requests.

Up to 4 outstanding requests per channel on PCI-E bus.
Ordering insured on returning completion data.
Completions with correctable errors discarded but tracked, completions with uncorrectable errors dropped and logged.
Host queue start/stop support.
Interface for configuration, status, and diagnostic registers.

Data in host memory is organized into buffers with an address and length associated with it. The host driver allocates these buffers and prepares address/length pairs in Work Items (WI) which are then pulled on-chip by HQM Tx block 520 and maintained in a database called Scatter-Gather Database (SGD) 522. There are 8 priorities per Tx port, thus 16 Transmit SG Queues for 2 ports. There are 128 RxQs in host memory and correspondingly 128 Rx SG queues. SGD thus provides a total of 128+16=144 SG queues to maintain on-chip Host Vectors.

A single RxQ/TxQ is required to keep a 10G Ethernet link busy. The average number of on-chip host vectors required for each RxQ is three vectors since one frame will need one Rx buffer. On Tx side, each Tx priority needs 12 host vectors.

When the HQM Tx block 520 processes a Tx Work Item from the host, the control information that the TXA block 516 needs to process the command is passed to the TXA block 516 through command buffers in the TEQ block 524. Each event passes through the TEQ block 524 in FIFO order.

Events that are processed by the TXA block 516 and posted on the TXA event completion interface are made available to the HQM Tx block 520 from the internal queues of the TEQ block 524. All TxQs with completions pending are processed in round-robin order and the winning TxQ is indicated to the HQM Tx block 520 along with a status bit indicating that a completion is available for processing. When the HQM Tx block 520 is ready to initiate an event read, it captures the TxQ index being provided by the TEQ block 524 and asserts a read request towards the TEQ block 524. The event read logic in the TEQ block 524 will capture the HQM Tx block 520 event read request and then must arbitrate for access to the array that contains the event data.

The Transmit Agent (TXA) module 516 receives transmit requests as Ethernet event forms from the Packet Memory Manager block 512 and queue requests from TxQ. It arbitrates between them, and selects one to be processed based on a programmable priority arbitration scheme. The selected transmit event/request results in a packet being sent to the Per Priority Link Buffer (PLB) block 530. As the frames are parsed by the TXA module 516 and depending on the settings in this configuration data, several security checks may be performed to ensure the packet should be sent. Assuming it is the frame is written into the PLB block 530.

In the case of TxQ queue requests, the data flows from the TxFDS block 538 into the PLB block 530 with only the addition of a packet header and possibly the calculation and insertion of an FC-CRC checksum being done for additional processing.

With respect to FCoE frames, the TXA module 516 can handle both "hard FCoE" and "soft FCoE" frames. Hard FCoE frames are pre-generated frames that come from the TxFDS block 538 and have minimal processing done to them by the TXA module 516. Soft FCoE frames are generated by software and sent via the Ethernet path through the TXA module 516.

Functions the TXA module 516 supports:
L3 checksum offload
L4 checksum offload
FCoE checksum offload
TCP segmentation offload Virtualization source/destination address and VLAN checks
VLAN insertion
VNTag insertion The Priority Link Buffer (PLB) block 530 sits on the datapath between the Transmit Agent (TXA) module 516 and the Ethernet MAC 506. Each Ethernet port has its own PLB block 530. As the name suggests, the PLB block 530 receives L2 synthesized frames from the TXA module 516 and stores them into 8 priority buffers for performing priority based transmission.

The PLB block 530 uses deficit round-robin arbitration to determine the priority buffer whose frame, at buffer head, will be transmitted. The PLB arbiter receives the per-priority network flow control from the BPC block 510 and also the corresponding per-priority flow control from the Packet Manager (PMM) block 512 and uses both sets of flow control information to make the arbitration decision. In addition to flow control, the network interface receives congestion controlling rate-limiter information.

Ethernet/FC chip 300 supports stateless TCP offload and the TCP checksum is calculated by the TXA. Since the TCP checksum is calculated over the entire TCP Protocol Data Unit (PDU), the TXA module 516 provides the L4 checksum to the PLB block 530 at the end of the frame transfer. This feature forces the PLB block 530 to operate in store-and-forward mode with the arbitration for a frame beginning only after the PLB block 530 receives the frame in its entirety.

The Back-Pressure Control (BPC) block 510 in the Ethernet/FC chip 300 supports the pause function commonly referred to as PPP. This pause function is also referred to as Class Based Flow Control (CBFC). In addition to CBFC, the BPC block 510 also supports the pause function defined in Annex 31B of the IEEE 802.3 specification.

The BPC block 510 sits between the Ethernet MAC 506 and the Receive Admission block (RAD) 508. The BPC block 510 examines every received packet and does not forward the pause frames to the RAD block 508. For the received pause frames the BPC block 510 takes the appropriate action and either pauses or un-pauses the transmitter. The BPC block 510 also takes information from the Packet Memory Manager (PMM) block 512 to determine when to transmit pause frames. The BPC block 510 uses the status information from the PMM block 512 to generate either standard pause frames or CBFC pause frames. These are sent to the Per-Priority Link Buffer (PLB) block 530 and are treated as the highest priority in its arbitration for the MAC transmit interface.

The Lookup Table Module (LUT) 528 provides support services to the mainline transmit and receive blocks in the Ethernet side of the Ethernet/FC chip 300. Software/firmware uses the register interface to write configuration information into the various array structures as well as to read back statistics that have been updated by the hardware. The LUT block 528 provides support for a single Ethernet port. It is instantiated twice in the Ethernet/FC chip 300, once for each port. Specific supported functions are described below:

Associates a 48 bit MAC unicast address with one of 64 port specific functions.

Associates a 48 bit MAC multicast/broadcast address with 1 of 256 multicast vectors in the RxA block 514. If no exact match is found, an 8 bit hash is provided instead.

Provides Ethernet configuration data requested by the RAD block 508, RXA block 514, and TXA module 516.

Updates function specific frame and byte counts as indicated by RXA block 514 and TXA module 516.

Provides function specific VLAN configuration information to the RXA block 514 and TXA module 516.

Ethernet frames which are received by the Eth MAC 506 are forwarded to the Receive Admission (RAD) block 508. The RAD block 508 parses the packet to check for errors and obtain information about the packet. For example, the RAD block 508 determines if it is an FCoE packet or a TCP/IP packet and determines the offsets of the various protocol headers in the packet. The RAD block 508 also assists the RxA block 514 in determining on which receive queue to send the packet up to the system.

The RAD block 508 uses a CAM to return a function ID that is associated with the destination MAC address. This function ID can then be used to generate an RSS hash which the RxA block 514 uses to determine the receive queue. Depending on the priority of the packet and the target queue, (RxA block 514 or RxFDS block 536), the RAD block 508 will send the packet to 1 of 16 queues. It will also update a form with the information it determined when it parsed the packet.

The RAD block 508 performs packets classification based on:
DA MAC address lookup
Multicast DA address lookup
Compute Multicast address hash.
RSS computation (Configurable hash types).
Performs error checking such as checksum/crc errors, etc.
FCoE path classification.
Header parsing—Identify L3/L4/L5 offsets.
L3 header checksum validation
L4 (TCP/UDP) checksum validation
Intercepts Congestion Management frames (BCN) and MAC Management frames and forward them to the RxFDS block 536 queue.

The Packet Memory Manager (PMM) block 512 is responsible for storing of incoming and outgoing forms and packets and managing the data traffic between the different processing engines. The PMM block 512:

Provides packet storage per port and per priority
Performs packet bookkeeping per port and per priority
Implements form routing between queues and interfaces.
Arbiters the memory access to both data and control memory per interface and access type.
Applies back pressure to the BPC block 510 according to predefined watermarks per priority.

The RxA module or block 514 provides services to enable the transfer and flexible routing of received frames from on-chip buffers to either the Ethernet driver in the host or to buffers associated with the Fibre Channel (FC) logic. Frames are delivered to the RxA module 514 by the PMM block 512 via 8 priority queues for Ethernet frames and 8 priority queues for FC frames. Once a frame is available on the PMM interface, the logic in the RxA module 514 uses information collected from internal data structures as well as several external interfaces to determine where the received data is destined, and exactly how it must be transferred. In addition to the basic priority based processing provided for all received Ethernet and FC frames, the following features are supported on a per-function basis for Ethernet frames:

Header Data Split (HDS) for unicast IP/TCP/UDP frames without IP options.
Receive Side Scaling (RSS) support
Multi/Broadcast spraying
Small/Big Buffer Thresholding only for IP/TCP/UDP The PCI-E APP block 304 connects the PCI-E core 562 to the LDMA block 526 and the FC DMA block 558. Briefly, the SGM block 550 is connected to the FC DMA block 558 and the CPUs 542. The FC DMA block 526 allows for bus mastering in the Ethernet/FC chip 300, i.e., to move data to and from the host memory.

An I/O command is fetched via the PCI-E core 562 and PCI-E APP block 560 by the FC DMA block 558, which forwards the command to the CPQ block 544.

On the FC side of the Ethernet/FC chip 300, two Fibre Channel media access controllers (MACs) 534 provide an interface to a SAN fabric. An upstream path between the FC MACs 534 and the PCI-E APP block 560 comprises receive buffers in a receive frame data storage unit (RX FDS) block 536, an encryption unit 556, and the FC DMA block 558. A downstream path between the FC MACs 534 and the PCI-E APP block 560 comprises the FC DMA block 558 an Encryption Unit 556, and transmit buffers in a transmit frame data storage unit (Tx FDS) block 538. The Tx FDS block 526 and the Tx FDS block 538 communicate with the CPUs 542, and the Tx FDS block 538 additionally communicates with the transmission queue (TxQ) block 552. A crossbar I/O handler (IOH) block 540 receives data from the FC MACs 534 and communicates with the transmit FDS block 538, the CPUs 542, and the IOQ block 554. The IOQ block 554 communicates with the IOH block 540, the FC DMA block 558, and the CPU queue (CPQ) block 544. The CPQ block 544 receives data from the IOQ block 554, the TxQ block 552, and the FC DMA block 558, and transmits data to the CPUs 542.

Operation of the components of the Fibre Channel side may be explained by discussing I/O flow in the Ethernet/FC chip 300, based on example commands. I/O flow in the Ethernet/FC chip 300 comprises three phases: a command phase, an execution phase (comprising, e.g., execution of a read command or a write command), and a completion phase.

The command phase is initiated by the FC DMA block 558 in the Ethernet/FC chip 300, in conjunction with the issuance of a command from a host CPU to a source device (in the case of a read) or a target device (in the case of a write) in a SAN fabric Briefly, an I/O command is originated by a host CPU, and the FC DMA block 558 fetches the I/O command from the I/O command ring in the host's memory and schedules a request to a processor 542 for execution. Preferably, each command entry has a bit allocated to decide which CPU 542 the command is scheduled to. Any remaining definitions for the request are defined in software.

The FC DMA block 558 comprises eight engines, each engine prefetching commands from I/O command rings in host memory. The FC DMA block 558 is configured such that the host blade is the producer and the Ethernet/FC chip 300 is the consumer (i.e., the FC DMA block 558 emulates a FIFO in the host memory). The difference in producer-consumer pointers (referred to as the producer-consumer index) tells the FC DMA block 558 when the message rings in the host memory are not empty. Based on the producer-consumer index, the FC DMA block 558 queues a new command to one of the two CPUs 542 for execution. In a preferred embodiment, the FC DMA block 558 operates on fixed data sizes and memory addresses.

In further detail, a command phase is initiated when a host provides a command pointer to the Ethernet/FC Chip 300. The FC DMA block 558 queues the new command from the originating I/O command ring in the host memory by adding any necessary processor tags that define which CPU 542 is to perform the command. As long as there is a transmit buffer in the transmit FDS block 538 available for the channel associated with the entry in the I/O command ring, the FC DMA block 558 allocates a buffer, reads the entry, writes that data into the allocated buffer in the transmit FDS block 538, and queues the allocated buffer into a dedicated queue in the CPQ block 544 (discussed below) for the appropriate CPU 542. The command is forwarded from the CPQ block 544 to the appropriate set of message registers in one of the CPUs 542. The CPU 542 processes the request by setting up a state table in the IOH block 540 for the command and for related exchanges.

If the request is an accelerated I/O (i.e., a read command or a write command), the CPU 542 allocates an originator exchange identifier (OXID) and sets up the scatter-gather state in SGM block 550, the I/O state table in the IOH block 540, and the encrypt state in one of the Encryption Unit 556. Then, the CPU 542 creates the FCP command frame and queues the FCP command frame to the TxQ block 552. Assuming that the I/O proceeds normally, the Ethernet/FC chip 300 continues processing received I/O data frames without any CPU intervention. When processes related to the command phase are complete, the FC DMA block 558 moves on to check the next command entry in the host memory, thus continually queuing new entries.

The CPQ block 544 functions as an event scheduler in the Ethernet/FC chip 300. The CPQ block 544 allows commands to be processed by a CPU 542. Functionally, the CPQ block 544 is a set of queues that point towards the CPUs 542. The CPQ block 544 provides two independent sets of queues with scheduling functions to the CPUs 542, so that one CPU is not blocked by resource limitations on the other CPU. Based on the type of event and its priority, different queues are maintained for events for each CPU. The CPQ block 544 follows a "push" model, which implies that events are queued to the CPU 542 by the CPQ block 544, rather than the CPU pulling events to process from these queues. The CPQ block 544 scans the event queues and based on a pre-determined priority, pulls out an event from a particular queue to submit it to the corresponding CPU 542. This mechanism improves firmware efficiency by avoiding utilization of a "polling" scheme by the CPUs 542.

Data sent to the CPQ block 544 may be sent from the FC DMA block 558, the IOQ block 554, or the TxQ block 552. The queues in the CPQ block 544 provide a mechanism for hardware adjacent to the CPUs 542 to inform the CPUs 542 of events on which the CPU software can act. One skilled in the art will appreciate that numerous queues exist or may be defined for events which need to be acted upon. In a preferred embodiment according to the invention, each independent set of queues in the CPQ block 544 includes: a Host Command Queue for new commands that the FC DMA block 558 pulls from host memory; a FC Receive queue dedicated to incoming FC frames that the other hardware components in the Ethernet/FC Chip 300 will not act on or be able to resolve; a Transmission Queue buffer release queue for when a local processor 542 generates a frame and ships it to the Fibre Channel; a Transmission Queue timeout queue for when a frame times out in the transmission queue; an IOH Timeout queue for timeouts seen by the I/O handler block 540; separate IOST Timeout queues for when read and write I/O processes time out; a single-deep Host Mailbox queue, for direct host-to-CPU communication; and a CPU Mailbox queue for messages passed between CPUs 542. The CPQ block 544 additionally includes an interrupt queue, for routing any interrupts to the CPUs 542. Interrupts are routed to one of the two CPUs 542, depending on the process the interrupt is directed to. In one embodiment according to the invention, the interrupt queue is a single-deep queue. The enqueue to the CPQ block 544 is based on one of the above events. Dequeuing is based on a CPU 542 being able to accept another request.

The execution phase corresponding to a read command, e.g., from a host blade for resources on a source network component in a fabric, commences after completion of the command phase discussed above, where the command is a read command from the CPU of a host. At a high level, the read command is sent from the CPU 542 to the source network component in the FC fabric via the transmit FDS block 538 and the TxQ block 552. Upon receiving the read command, the source network component sends a response in the form of Fibre Channel data (i.e., the data the host intends to read) to the Ethernet/FC chip 300. A source that has received a read command from the Ethernet/FC chip 300 sends read data frames to the Ethernet/FC chip 300 via the Fibre Channel fabric The read data frames are received on an FC receive port via an FC MAC 534.

The FC MACs 534 serve as interfaces between outside Fibre Channel links and logic internal to the Ethernet/FC chip 300. Thus, the FC MACs 534 are responsible for converting downstream (outbound) data to an appropriate FC sequence, and for converting upstream (incoming) data from an FC sequence. The FC MACs 534 include a Fibre Channel protocol manager (FPM), which maps command data onto a Fibre Channel sequence, and maps received data from a Fibre Channel sequence.

From the FC MACs 534, the data in a frame is sent to receive FDS block 536 and portions of the data are provided to the IOH block 540. In general terms, the IOH block 540 performs necessary functions related to accelerated FCP processing, and the receive FDS block 536 performs two functions: it stores incoming frames from FC wires, and it acts as a buffer for communication from CPUs 542 to the host. The Ethernet/FC chip 300 has two independent FDS units block 536 and block 538 (i.e., one each for transmit and receive data paths), each comprising a plurality of buffers. The buffers in the receive FDS block 536 are divided into four groups: two for the FC MACs 534, and one group for each of the CPUs 542. In an upstream flow, data is received via a buffer in the receive FDS block 536. The receive FDS block 536 stores the frames received on the FC ports that are uplinked to host memory.

As multiple data frames may be sent with some overlap, the IOH block 540 captures all upstream and downstream frames and associates the transmissions with the correct process. In the context of a read command, the IOH block 540 validates each incoming frame, associates the frame with the appropriate I/O, and queues the frame to the IOQ block 554. In a preferred embodiment, the IOH block 540 associates the data in properly validated frames to the correct I/O process and forwards this association to the IOQ block 554. Validation, in the context of the IOH block 540, includes checking all incoming frames for consistent, valid primitives, i.e., a start of frame (SOF) field, an end of frame (EOF) field, and a cyclic redundancy code (CRC). Any frame with an inconsistent SOF or EOF, an invalid EOF, or a failed CRC is preferably discarded with its buffer queued to the receive FDS block 536 for deallocation.

Following validation, the frame is parsed by the IOH block 540 to figure out whether the frame maps to any currently active I/O process. More specifically, the IOH block 540 utilizes routing state tables to control the flow of the upstream data. The IOH block 540 comprises an I/O state table, and the incoming data frame is looked up in the I/O state table (IOST). If the frame does not map to a currently active I/O process, then the frame is sent to one of the CPUs 542 for appropriate handling. If the frame does map to a currently active I/O process, then the IOH block 540 determines the next operation to be done on that I/O process and routes the frame through a hardware accelerated path, using the IOQ block 554 to execute the operation. Specifically, the IOH block 540 provides commands to the IOQ block 554, which routes the commands to the appropriate block in the Ethernet/FC chip 300, and consequently, to the appropriate host (e.g., host blade).

In the context of a read command, the IOQ block 554 schedules the frames to the FC DMA block 558. The I/O queue block (IOQ) block 554 is a queue of all pending events for I/O processes that are currently active. The IOQ block 554 comprises three queues: a downlink queue, an uplink queue, and an uplink message queue. For host initiated read commands, the queues in the IOQ block 554 hold the read data frames and transfer the payload from these frames into the appropriate location in the host memory.

Concurrent to the IOQ block 554 routing discussed above, the receive FDS block 536 sends blocks of data to the Encryption Unit 556, which detaches data integrity fields, decrypts and authorizes data, and performs any necessary data format conversion. Thus, in a preferred embodiment according to the invention, DIF operation may be performed on the way to the host memory. Once decryption tasks are complete, the data is forwarded to the FC DMA block 558.

The FC DMA block 558 receives the data from the Encryption Unit 556, and works with the SGM block 550 to continuously move data for all the frames related to the command to the host memory. In other words, DMA transfers for read operations in the Ethernet/FC Chip 300 are accomplished by the FC DMA block 558 with the aid of the SGM block 550, which allows the transfer of data to multiple memory areas in a single DMA transaction. In coordination with the SGM block 550, the FC DMA block 558 sends incoming data from the buffers in receive FDS block 536 to the host via the PCI-E APP block 560 and the PCI-E core 562.

More specifically, the FC DMA block 558 determines whether data corresponds to the read command based on information it receives from the IOQ block 554. The FC DMA block 558 strips header and trailer information from received data that corresponds to the response to the read command, and uses the SGM block 550 to send the data to the appropriate host. Once the FC DMA block 558 has completed its processing, the IOQ block 554 releases the receive buffer in FDS block 536, and schedules the next frames.

The FC DMA block 558 is capable of working under multiple I/Os at the same time in order to utilize the available bandwidth on the PCI link. The data portion of any FCP I/O process is mapped to a linked list of addresses in the host memory, which is referred to as scatter/gather list. For each FCP I/O process, the CPU 542 sets up the initial pointer to the scatter/gather list and then hands over control to the scatter/gather manager (SGM) block 550. The SGM block 550, under control of the IOQ block 554, keeps getting the next set of addresses from the host on an as needed basis. These are the addresses where data is written to when working on an initiator read command.

The execution phase as it corresponds to a write command, e.g., from a host to a network component in a fabric, commences after completion of the command phase discussed above, where the command is a write command from the CPU of a host. A write command is sent from the CPU 542 to the target device in the FC fabric through the transmit FDS block 538 and the TxQ block 552, as discussed above. When the target device is ready to accept the write, it sends a "transfer ready" message to the Ethernet/FC chip 300. From the Fibre Channel fabric, the Ethernet/FC chip 300 receives the transfer ready message from the target on a port in FC MAC 534.

The IOH block 540 validates the transfer ready message and then continually instructs the IOQ block 554 to generate write data frames for the I/O until the transfer data is exhausted. After the IOH block 540 receives the transfer ready message, it creates a header for the write data (from the host) and instructs the IOQ block 554 regarding appropriate frame sizes to be sent from the host.

As mentioned above, DMA transfers for read and write operations in the Ethernet/FC Chip 300 are accomplished with the aid of the SGM block 550. The downstream DMA controller 310 sends data from a host to a Fibre Channel device. More specifically, data is sent from the downstream DMA controller 310 to the Encryption Unit 556 in coordination with the SGM block 550.

The data portion of any FCP I/O is mapped to a linked list of addresses in the host memory. This linked list is referred to as scatter/gather list. For each FCP I/O, the CPU 542 sets up the initial pointer to the scatter/gather list and then hands over control to the SGM block 550. The SGM block 550, under control of the IOQ block 554, continually retrieves a next set of addresses from the host on an as-needed basis. These are the addresses where data is read from when working on an initiator write command or where data is written to when working on an initiator read command.

For host initiated writes, the IOQ block 554 holds at most a single event per I/O to generate the next write data frame. The IOQ block 554 merges the payload from the host blade and the header from the IOH block 540 to form a write data frame and then queues the frame to the TxQ block 552. The IOQ block 554 allocates a buffer from one of eight pools and instructs the FC DMA block 558 to generate the next data frame for the I/O. The IOQ block 554 also informs the IOH block 540 when the frame is queued to the TxQ block 552.

The FC DMA block 558 pulls data from the host memory and pushes it onto the transmit FDS block 538 under control of the IOQ block 554. The FC DMA block 558 is capable of working under multiple I/Os at the same time to utilize the available bandwidth on the PCI link. More specifically, the FC DMA block 558 works with the SGM block 550 and downloads the data into the allocated transmit buffer block 538, and then queues the transmit buffer block 538 to the TxQ block 552. The data is retrieved using the SGM block 550 and FC DMA block 558, is split into the appropriate frame size(s), and is merged with the header in the transmit FDS block 538. DIF operation may be performed in the Encryption Unit 556 on the way to a buffer in the transmit FDS block 538, as discussed above with respect to a read command. More specifically, the Encryption Unit 556 attaches data integrity fields, encrypts and authorizes data, and performs any necessary data format conversions.

As mentioned above, the Ethernet/FC chip 300 has two independent FDS units block 536 and block 538 for transmit and receive data paths. The transmit FDS block 538 stores frames that are downlinked from the host memory and transmitted out on Fibre Channel (FC) ports. In a downstream flow, data is sent to a transmit FDS block 538 after encryption. The transmit FDS block 538 comprises a plurality of buffers to perform two functions: to carry frames that may eventually be transmitted on FC wires, and to act as a buffer for communication from the host to the CPUs 542. In a preferred embodiment, the transmit FDS block 538 comprises 240 buffers that are preferably divided into 18 groups, referred to as "virtual channels." These virtual channels map to the message rings in the host. Each virtual channel has two groups of buffers in the transmit FDS block 538. A first group of buffers is used to allocate buffers for the messages from the host, and the other group is used to allocate buffers for the data frames that the Ethernet/FC chip 300 generates. Additionally, a group of buffers is reserved for each CPU 542.

The transmit FDS block 538 performs segmentation and reassembly (SAR) duties before the data is sent to a FC media access controller (MAC) 534, where the data is processed and sent on an FC network. The transmit FDS block 538 also sends completion messages to transmission queue (TxQ) block 552, concurrent with or after sending the data to an FC MAC 534.

After the Ethernet/FC chip 300 has initialized (i.e., is write transfer ready), it generates data frames honoring FC-FS, FCP and target specific rules. No CPU intervention is necessary during this phase, assuming that the Sequence ID of the write is statically allocated to an I/O process. The data is then sent to the appropriate destination in the FC fabric via the transmission queue and the FC MAC 534.

After completion of a command, a response frame (i.e., a completion) is sent by the target/source to the host through the Ethernet/FC chip 300. The response frame is captured by the IOH block 540 and the receive FDS block 536. The IOH block 540 associates the response frame with the correct I/O process, confirms the nature of the response, and sends the response frame via the IOQ block 554 and the CPQ block 544 to the appropriate register in one of the CPUs 542. More specifically, the response frame is queued in the CPQ block 544, and when the CPU 542 receives the response frame, the CPU 542 uses the appropriate buffer in the receive FDS block 536 to build a completion, and sends the completion to the host that originated the command via the FC DMA block 558, the PCI-E APP block 560, and the PCI-E core 562. The FC DMA block 558 moves the response frame from the receive FDS block 536 to the host memory, and then releases the receive FDS block 536.

The FC DMA block 558 operates in a manner similar to the FC DMA block 558 discussed above. The FC DMA block 558 creates a FIFO in the host memory such that the Ethernet/FC chip 300 is the producer and the host blade is the consumer, and has eight different reply rings (also referred to as DMA virtual channels) mapped to the corresponding completion rings in the host 202. The FC DMA block 558 strips any processor tags that were added to the completion data and pushes the completion back to a completion ring in the host memory.

The FC DMA block 558 returns reply messages (prepared by the CPUs 542) from the receive FDS block 536 to host memory to complete an initiator mode I/O command or to start a target mode I/O. The FC DMA block 558 supports eight concurrent reply rings (DMA virtual channels). The reply ring is a circular queue structure with a statistically defined depth. The host blade owns the consumer index while the FC DMA block 558 owns the producer index. The producer index and consumer index are both registers in the FC DMA block 558. The producer index is writable by the FC DMA block 558 and read only by the host blade, while the consumer index is writable by the host blade and read only by the FC DMA block 558. The FC DMA block 558 maintains a shadow producer index register located in the host system memory. New reply message discovering on host blade side is accomplished by the host blade pulling the shadow producer index value based on interrupts (i.e., an interrupt coalescing mechanism is implemented). The FC DMA block 558 ensures that the reply queue FIFO is not overrun by checking the producer index and the consumer index. The host blade checks the producer index and the consumer index to determine how many new outstanding reply messages exist, and then processes them based on the exchange IDs. The FC DMA block 558 maintains eight state machines (one on each virtual channel) to control the requests from the CPUs 542. The FC DMA block 558 re-asserts an 'available' signal as an indication to the IOQ block 554 after the message is moved up to the host blade, so that the CPUs 542 and the IOQ block 554 can release the appropriate frame buffer in the receive FDS block 536. The FC DMA block 558 implements DMA with fixed write burst lengths of 64 or 128 bytes, as discussed above.

The CPUs 542 perform various functions in the Ethernet/FC Chip 300 too complex to be performed by other hardware, such as translation of requests from a host blade, handling the command phase of a request, and completion of a request as it relates to a FC port and to a host blade. The CPUs 542 have identical configurations and interface logic, and further, the CPUs 542 are not hardwired to a specific FC port. Thus, while two CPUs 542 are discussed for the purposes of example, one skilled in the art will appreciate that the Ethernet/FC chip 300 may comprise any number of CPUs, as well as different registers therein, without departing from the scope of the invention. Each CPU 542 comprises interface logic to connect to other modules in the Ethernet/FC chip 300.

The transmit paths of the Eth MACs 506 and the FC MACs 534 connect to two multiplexers 564, 566, with one port to each multiplexer. The selection of multiplexer 564 is the Ethernet/FC port 0 selection bit, while the Ethernet/FC port 1 selection bit is used with multiplexer 566. By appropriately setting the selection bits, any of the three modes can be selected. The outputs of the multiplexer 564 and 566 are provided to line encoders 504A, 504B. The line encoders 504A, 504B receive the appropriate Ethernet/FC port selection bit and port speed bits, which identify the desired port speed, to determine the proper line encoding/decoding, either 8b/10b or 60b/66b for the preferred embodiments. The transmit outputs of the line encoders 504A, 504B are provided to the serdes 502A, 502B. The serdes 502A, 502B receive the appropriate port speed bits to match the serdes to the desired speed. The serdes 502A, 502B then provide transmit signals from the Ethernet/FC chip 300.

The serdes 502A, 502B receive the receive signals provided to the Ethernet/FC chip 300. The receive outputs of the serdes 502A, 502B are provided to the line encoders 504A, 504B. The receive outputs of the line encoders 504A, 504B are provided to demultiplexers 568 and 570. One output of demultiplexer 568 is provided to the Eth MAC 506 while the other output of demultiplexer 568 is proved to the FC MAC 534. Similarly, the outputs of the demultiplexer 570 are also provided to the Eth MAC 506 and the FC MAC 534. The Ethernet/FC Port 0 select bit is used with demultiplexer 568 and the Ethernet/FC Port 1 select bit is used with demultiplexer 570.

Thus each port can be Ethernet/FCoE or FC based on the port select bits. This allows two Ethernet/FCoE ports, two FC ports or one Ethernet/FCoE port and one FC port, either port being one protocol and the other port being the other protocol.

In the preferred embodiments the Ethernet/FC chip 300 has several internal power domains. Of most relevance to this multi-function discussion are the Ethernet domain 580, the FC engine domain 582 and the FC MAC domain 582. If the Ethernet/FC chip 300 is configured only for FC operation, power is turned off to the Ethernet domain 580. If the Ethernet/FC chip 300 is configured for FCoE/Ethernet operation, the FC MAC domain 582 is turned off. The FC engine domain 582 must remain on to handle FCoE frames. If the Ethernet/FC chip 300 is operating in an Ethernet-only environment and no FCoE operations will occur, then the FC engine domain 582 can also be turned off. In this manner the power usage of the Ethernet/jFC chip 300 is minimized based on the actual protocols being utilized.

As discussed above, the Ethernet/FC chip 300 has three different modes of operation and is controlled by Ethernet/FC port select bits. The personality of the Ethernet/FC chip 300 is set up through the Flash memory 308 in one embodiment. Before turning on the core and CPU PLLs, a number of these registers are loaded from the Flash memory 308 to set up the device correctly. Since the Ethernet/FC chip 300 is a mixed mode device, the port personality needs to be defined first. The port personality is used by the line encoder and SERDES blocks to decide on which protocol to which port.

The Port Configuration Registers 572 reside in the PCI-E APP block 560, so they are not accessible in the aux power mode. However, a copy of the register bits is present in the Flash Memory 308 and used by WGN block 532 as well.

Two registers define the port configurations. These are illustrated in Table 2 and Table 3 below.

TABLE 2

Port Personality Register (one per port)

| Register field | Field location | Default Value | Description |
|---|---|---|---|
| port_is_FC | 0:0 | 0 | This bit indicates whether the port is an FC port or an Ethernet port. |
| FC_port_speed | 2:1 | 0 | 00 = reserved<br>01 = reserved<br>10 = reserved<br>11 = 8 G FC |
| port_is_dual_8G | 3 | 0 | If this bit is set, then 2 8 G ports will be used to transfer 16 G using Brocade FC trunking. In this mode two SERDES lanes transfer data across the backplane to an attached switch |

TABLE 3

PF personality register (one per PF)

| Register field | Field location | Default Value | Description |
|---|---|---|---|
| Active | 0:0 | 0 | Activate PF |
| Personality | 0:0 | 0 | 0 = Ethernet 1 = FC |
| line_port | 3:2 | 0 | 00 = port 0<br>01 = port 1<br>1X = both ports 0 and 1 (link aggregation mode) |

If the Ethernet/FC chip 300 is operational, changing these registers 572 will change the functions of the ports on the fly or dynamically. However, this can cause problems with the host operating system as it may necessitate a driver change because of new PFs. This can be addressed in several different manners. In one case all potentially relevant drivers can be loaded at boot time but this has kernel and loading issues. A second case is to require the server or blade to be soft reset, thus causing the PCI setup cycle to be performed again. While this may sound troublesome, in most practical situations this reconfiguration would not be performed while the given server blade was in a production use but rather during a scheduled maintenance interval. A third case is to utilize the PCI-E Hot Plug mechanisms to simulate the device being removed and then reinstalled. This case requires additional management and driver support. A fourth alternative is PCI I/O virtualization, which capabilities are currently being integrated into both hardware and operating systems.

In cold boot situations, such as initial power up or on WOL, the configuration values stored in the Flash Memory 308 are utilized. The Flash configuration to initialize the Ethernet/FC chip 300 is stored in two separate segments in the Flash Memory 308. A first segment stores the device personality, port personality, PF personality and all the config/capability registers for PCI-E initialization. A second segment stores the WGN initialization vectors.

In the preferred embodiment the Ethernet/FC chip 300 has the ability to erase segments in the Flash memory 308 through either the Baseboard Management Controller (BMC) for a blade-server configuration or through the network for an adaptor configuration.

Figure 6:
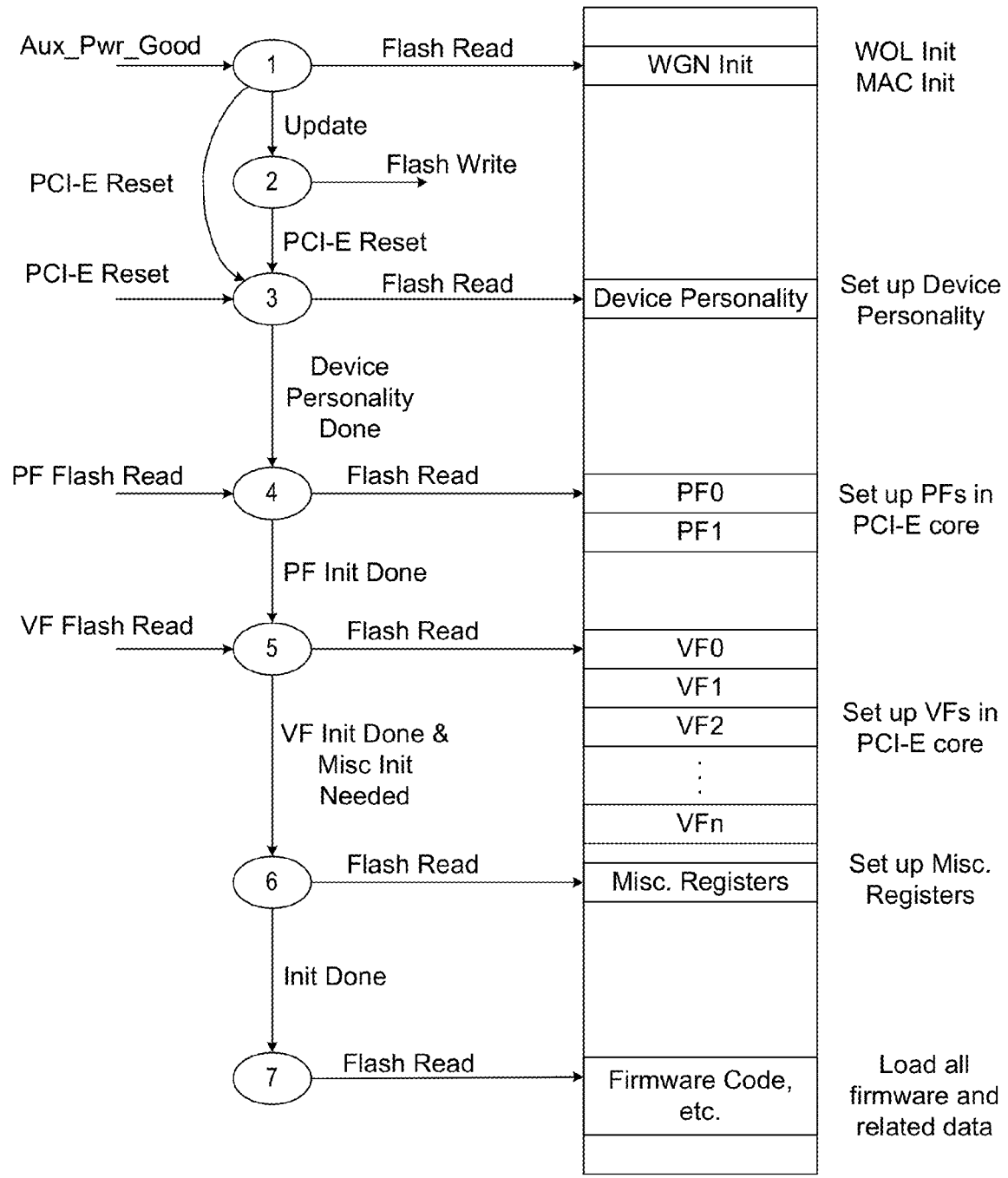
FIG. 6 is a diagram indicating an initialization process for the Ethernet/Fibre Channel chip of FIGS. 3A and 3B according to an embodiment of the invention.

FIG. 6 illustrates the operations performed to initialize the Ethernet/FC chip 300 during these power up or WOL operations. Table 4 below provides the description for FIG. 6.

TABLE 4

Initialization

| Flash Init stage | Description |
| --- | --- |
| WGN Init (1) | Before main power comes on, the Flash Controller 574 initializes the WGN registers and Programmable Engine for NC-SI and Wake-On Lan operation. |
| Optional Update of configuration in the Flash (2) | Either through the BMC or the network, the configuration of the Ethernet/FC chip 300 is modified by rewriting the sector associated with the device configuration. |
| Device Personality Init (3) | This is performed every time there is a PCI-E_RESET. The Flash Controller 574 uses a known offset value within the Flash Memory 308 to get the Device Personality registers and program them into the chip 300. |
| Physical Function Init (4) | This is performed after a Device Personality Init, or any time a PF is reset. In the Flash Memory 308, each PF has an offset into its Init registers. This offset can either be hardcoded or can come from a Device Personality Init portion of the Flash Memory 308. On a PCI-E_RESET, all PFs need to be initialized through the Flash. The Flash Controller 574 reads the init code for each PF and programs the capability structures and other configuration registers accordingly for each PF. |
| Virtual Function Init (5) | After all PFs are initialized, the VFs, or virtual functions, are initialized next. On a PCI-E_RESET, all VFs are initialized. In the Flash Memory 308, each VF has an offset into its Init registers. This offset can either be hardcoded or can come from a Device Personality Init portion of the Flash Memory 308. |
| Misc Reg init (6) | After all other init is done, if needed other core registers can be initialized through the Flash Controller 574. |
| Main Init Done (7) | This stage is entered only then device comes out of PCI-E_RESET. In this stage, the firewall for the CPUs 542 is loaded and any other needed data is loaded. When those operations are complete, the Ethernet/FC chip 300 will be ready for operation. |

In one embodiment using the configuration jumpers 310, 312, different cards that are populated with the Ethernet/FC chip 300 can take on different personalities. The pin-configuration embodiment adds more flexibility for the Ethernet/FC chip 300 deployment. Instead of adding extra pins to support the device configuration, select pins on the chip 300 can be multiplexed, such as based on auxiliary power and the like. A state machine (not shown) reads the pins and stores the configuration internally for use by the Flash controller 574. The Flash controller 574 loads the on-chip registers with the Flash configuration. Additionally, the Flash Controller 574 examines the pin configuration to set-up the registers correctly.

As has been explained, an Ethernet/FC chip according to the present invention is capable of reducing the inventory for both manufactures and users, simplify the changeover between different protocols for users and allow greater flexibility in the combination and placement of switches and the like in blade chasses. In the preferred embodiments, two different protocols can be used, namely 10G Ethernet and 8G Fibre Channel. The chip of the preferred embodiments contains a full FC engine to act as an FC HBA and a full 10G Ethernet engine to act as a converged network adapter, when used in conjunction with portions of the FC engine. The chip has two ports, with the selection of protocol for each port being selectable. The selection can be made using pins, using values stored in a flash memory or using registers provided on the chip. Using the pin method, only one board need be inventoried and yet both capabilities can be provided. Selection can be made by the manufacturer as a default and then changed by the user if desired. Using the flash memory method, the manufacturer can preprogram the flash for a desired configuration and the user can change it using various software tools. Using the registers, the user can change the configuration while the chip is powered up and operating. Power savings are maximized for each configuration by disabling or powering down portions of the chip not needed for the deployed configuration.

In some cases of mezzanine boards different or additional signals may be needed depending on the particular protocol being utilized. For example, 10G Ethernet utilizes certain sideband signals not utilized by Fibre Channel. The Ethernet/FC chip and mezzanine board provide these additional signals when an Ethernet protocol is used, with the blade server board and/or embedded switch configuring themselves accordingly. Under certain conditions this may require a restarting of the blade server to properly reconfigure the blade server.

This description has mentioned the use of different protocols by the preferred embodiments. The exemplary different protocols have been Ethernet and Fibre Channel. For purpose of this description, the 10M, 100M, 1G and 10G variations of Ethernet are the same protocol and the 1G, 2G, 4G and 8G variations of Fibre Channel are the same protocol. Thus, in general, the same protocols have generally identical layer 2 (L2) formats and different protocols have generally different L2 formats. Ethernet and FCoE are considered the same protocol as they are both based on Ethernet L2, with differing L3 and so on formats. Exemplary different protocols would be Ethernet, Fibre Channel and InfiniBand. Those protocols are not compatible at the L2 level.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A network adapter card comprising:
a host interface for connection to a host computer;
a network interface including a physical connector having a port for connection to one of two different protocol physical networks; and
a chip connected to said host interface and said network interface which operates with at least one of two different network driver protocols, the two network driver protocols corresponding to the two network physical protocols, and operates according to at least one of the two different network physical protocols based on a selection made by a user, said chip transferring data between said host interface and said network interface physical connector port and said chip operable with a network driver protocol different from the network physical protocol for data transferred between said host interface and said network interface physical connector port, said chip including:
- a chip port connected to said port of said network interface;
- a first network protocol engine corresponding to a first of the different network protocols and having a port;
- a second network protocol engine corresponding to a second of the different network protocols and having a port; and
- a connection interface connected to said ports of said first network protocol and second network protocol engines and said chip port, said connection interface configured to allow said chip port to be connected to either of said ports of said first network protocol and second network protocol engines,
- wherein said first network protocol and second network protocol engines are interconnected to allow use of an encapsulated protocol so that said first network protocol engine is connected to said network interface and to said host interface and said second network protocol engine is connected to said network interface and to said host interface, such that encapsulated protocol data interfaces with a first protocol network through said first network protocol engine and with the host computer through said second network protocol engine, first network protocol data interfaces with a first protocol network through said first network protocol engine and with the host computer through said first network protocol engine and second network protocol data interfaces with a second protocol network through said second network protocol engine and with the host computer through said second network protocol engine.

2. The card of claim 1, wherein the selection is performed by applying selected values to selected inputs of said chip.

3. The card of claim 2, further comprising: a jumper arrangement connected to said chip for allowing the user to apply the selected values to selected inputs.

4. The card of claim 1, further comprising: a flash memory connected to said chip, said flash memory containing values for performing the selection.

5. The card of claim 1, wherein said chip contains registers which can be programmed using said host interface, the values of said registers performing the selection.

6. The card of claim 1, wherein said second network protocol engine is divided in a processing portion and a MAC portion and wherein said first network protocol engine and said second network protocol engines processing and MAC portions are in separate controllable power domains.

7. A network adapter integrated circuit comprising:
- a host interface for connection to a host computer;
- a network interface including a port for connection to one of two different protocol physical networks; and
- network adapter logic connected to said host interface and said network interface which operates with at least one of two different network driver protocols, the two network driver protocols corresponding to the two network physical protocols, and operates according to one of the two different network physical protocols based on a selection made by a user, said network adapter logic transferring data between said host interface and said network interface physical connector port and said network adapter logic operable with a network driver protocol different from the network physical protocol for data transferred between said host interface and said network interface physical connector port, said network adapter logic including:
  - a network adapter logic port connected to said port of said network interface;
  - a first network protocol engine corresponding to a first of the different network protocols and having a port;
  - a second network protocol engine corresponding to a second of the different network protocols and having a port; and
  - a connection interface connected to said ports of said first network protocol and second network protocol engines and said network adapter logic port, said connection interface configured to allow said network adapter logic port to be connected to either of said ports of said first network protocol and second network protocol engines,
  - wherein said first network protocol and second network protocol engines are interconnected to allow use of an encapsulated protocol so that said first network protocol engine is connected to said network interface and to said host interface and said second network protocol engine is connected to said network interface and to said host interface, such that encapsulated protocol data interfaces with a first protocol network through said first network protocol engine and with the host computer through said second network protocol engine, first network protocol data interfaces with a first protocol network through said first network protocol engine and with the host computer through said first network protocol engine and second network protocol data interfaces with a second protocol network through said second network protocol engine and with the host computer through said second network protocol engine.

8. The circuit of claim 7, wherein the selection is performed by applying selected values to selected inputs of said network adapter logic.

9. The circuit of claim 8, further comprising: pins for connection to a jumper arrangement for allowing the user to apply the selected values to selected inputs.

10. The circuit of claim 7, further comprising: inputs for a flash memory, the flash memory containing values used by said network adapter logic for performing the selection.

11. The circuit of claim 7, wherein said network adapter logic contains registers which can be programmed using said host interface, the values of said registers performing the selection.

12. The circuit of claim 7, wherein said second network protocol engine is divided in a processing portion and a MAC portion, and wherein said first network protocol engine and said second network protocol engines processing and MAC portions are in separate controllable power domains.

* * * * *